(12) United States Patent
Kistler

(10) Patent No.: US 11,214,207 B2
(45) Date of Patent: Jan. 4, 2022

(54) METHOD FOR PROVIDING ACTUATOR-BASED VEHICLE FUNCTIONS IN A MOTOR VEHICLE, AND MOTOR VEHICLE COMPUTING DEVICE AND MOTOR VEHICLE

(71) Applicant: AUDI AG, Ingolstadt (DE)

(72) Inventor: Günter Kistler, Niederlauterbach (DE)

(73) Assignee: Audi AG, Ingolstadt (DE)

( * ) Notice: Subject to any disclaimer, the term of this patent is extended or adjusted under 35 U.S.C. 154(b) by 348 days.

(21) Appl. No.: 16/478,388

(22) PCT Filed: Jan. 17, 2018

(86) PCT No.: PCT/EP2018/051055
§ 371 (c)(1),
(2) Date: Jul. 16, 2019

(87) PCT Pub. No.: WO2018/134218
PCT Pub. Date: Jul. 26, 2018

(65) Prior Publication Data
US 2019/0375349 A1    Dec. 12, 2019

(30) Foreign Application Priority Data

Jan. 17, 2017 (DE) .......................... 102017200655.2

(51) Int. Cl.
*B60R 16/02* (2006.01)
*B60R 16/023* (2006.01)
(Continued)

(52) U.S. Cl.
CPC .......... *B60R 16/0231* (2013.01); *G06N 20/00* (2019.01); *H04W 4/40* (2018.02); *H04W 76/10* (2018.02)

(58) Field of Classification Search
CPC .... B60R 16/0231; H04W 4/40; H04W 76/10; G06N 20/00
See application file for complete search history.

(56) References Cited

U.S. PATENT DOCUMENTS 5,673,668 A * 10/1997 Pallett .................. F02D 11/107
123/349
6,838,852 B1    1/2005 Namuduri
(Continued)

FOREIGN PATENT DOCUMENTS

| | | |
|---|---|---|
| CN | 101537835 A | 9/2009 |
| CN | 105446223 A | 3/2016 |

(Continued)

OTHER PUBLICATIONS

International Search Report and Written Opinion of the International Searching Authority directed to related International Patent Application No. PCT/EP2018/051055, dated Jul. 5, 2018, with attached English-language translation; 28 pages.
(Continued)

*Primary Examiner* — Behrang Badii
(74) *Attorney, Agent, or Firm* — Sterne, Kessler, Goldstein & Fox P.L.L.C.

(57) ABSTRACT

The disclosure relates to a method for providing vehicle functions in a motor vehicle, whereby vehicle functions are performed in a computing device of the motor vehicle and each of the vehicle functions performed generates command data for at least one respective actuator of an actuator device of the motor vehicle. The disclosure provides that the vehicle functions and the actuator device are coupled through an integration component and the vehicle functions respectively output the command data to the integration component by means of a respective actuator-independent call routine and the integration component converts the command data into respective actuator-specific control data (Continued)

and transmits the control data to the respective actuator by means of an actuator-specific control routine.

15 Claims, 1 Drawing Sheet

(51) Int. Cl.
*H04W 4/40* (2018.01)
*H04W 76/10* (2018.01)
*G06N 20/00* (2019.01)

(56) References Cited

U.S. PATENT DOCUMENTS

| | | | |
|---|---|---|---|
| 7,520,572 B2* | 4/2009 | Hatipoglu | B60T 8/175 |
| | | | 303/15 |
| 9,494,935 B2 | 11/2016 | Okumura et al. | |
| 9,606,537 B2 | 3/2017 | Hogenmueller et al. | |
| 9,961,551 B2 | 5/2018 | Scholl et al. | |
| 11,130,542 B2* | 9/2021 | Abbott | B62K 5/05 |
| 2001/0032748 A1* | 10/2001 | Demerly | B62D 17/00 |
| | | | 180/402 |
| 2006/0015231 A1 | 1/2006 | Yoshimura et al. | |
| 2006/0190155 A1 | 8/2006 | Meyer et al. | |
| 2007/0219666 A1 | 9/2007 | Filippov et al. | |
| 2010/0156171 A1 | 6/2010 | Sechrist | |
| 2013/0073169 A1 | 3/2013 | Emberson et al. | |
| 2014/0067231 A1 | 3/2014 | Mosher et al. | |
| 2014/0114498 A1* | 4/2014 | Pichler | B60R 16/0236 |
| | | | 701/1 |
| 2016/0311285 A1 | 10/2016 | Plettner et al. | |

FOREIGN PATENT DOCUMENTS

| | | |
|---|---|---|
| CN | 105637916 A | 3/2016 |
| CN | 105897809 A | 8/2016 |
| DE | 102004049155 B3 | 5/2006 |
| DE | 102012107886 A1 | 2/2014 |
| DE | 102014220781 A1 | 4/2016 |
| DE | 102015118489 A1 | 5/2016 |
| WO | WO-2004/037599 A1 | 5/2004 |

OTHER PUBLICATIONS

International Preliminary Report on Patentability directed to related International Patent Application No. PCT/EP2018/051055 completed Jan. 3, 2019, with attached English-language translation; 11 pages.
Chinese Application No. 201880007096.0. Office Action dated Sep. 3, 2021; 6 pages.

* cited by examiner

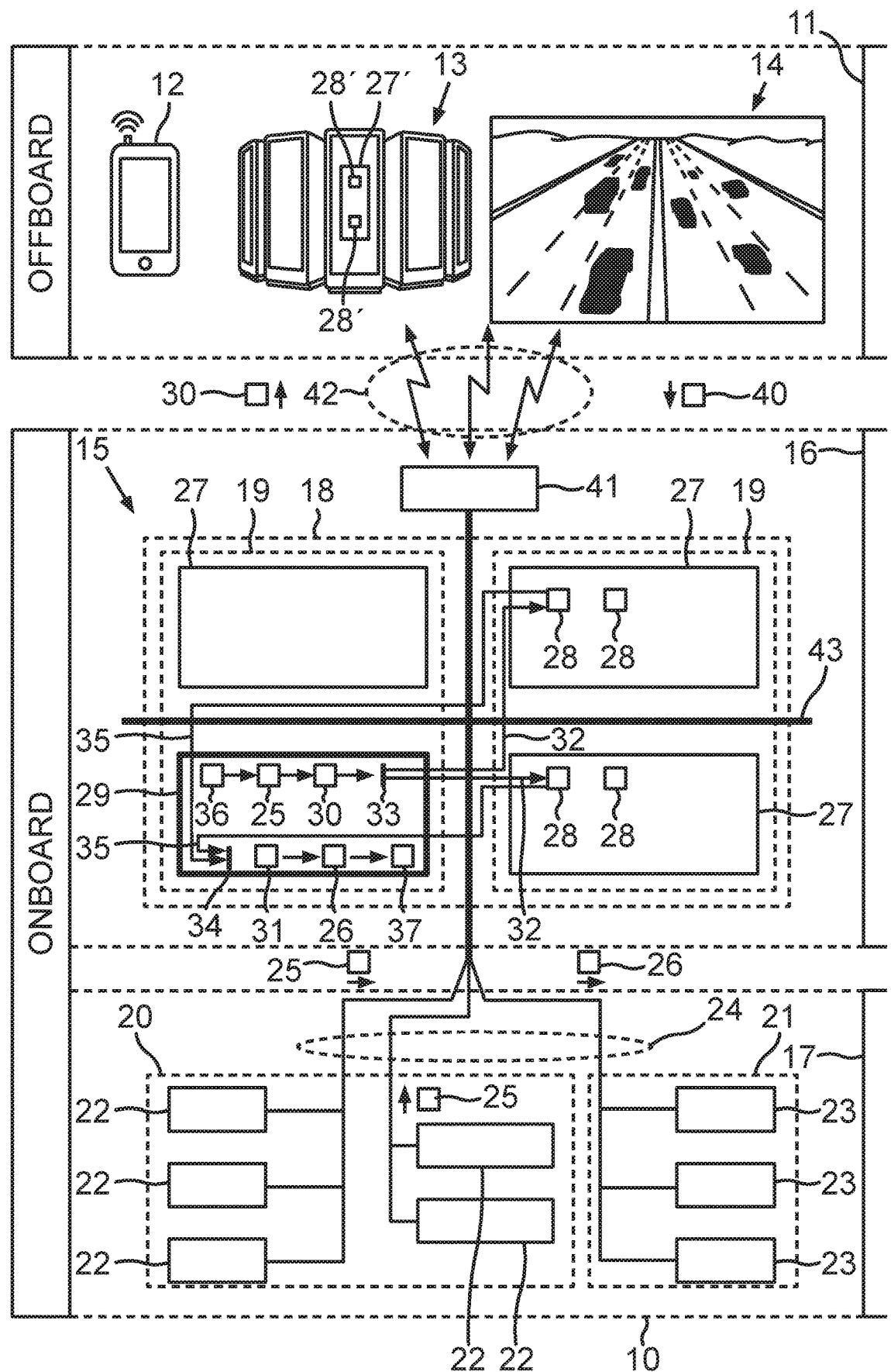

METHOD FOR PROVIDING ACTUATOR-BASED VEHICLE FUNCTIONS IN A MOTOR VEHICLE, AND MOTOR VEHICLE COMPUTING DEVICE AND MOTOR VEHICLE

TECHNICAL FIELD

The disclosure relates to a method for providing vehicle functions in a motor vehicle. Each vehicle function is sensor-based, i.e. they are performed based on sensor data of a sensor device of the motor vehicle. Therefore, there exists in the motor vehicle a sensor level and a higher computing level, at which a computing device performs a plurality of vehicle functions. Also pertaining to the disclosure is a computing device for performing the vehicle functions. Finally, the disclosure also includes the motor vehicle with a sensor device and with a computing device.

BACKGROUND

In a current control device, it is usually provided that it is constructed for a particular vehicle function and, for that purpose, is also directly interconnected with the sensors which are required for the vehicle function. The software or functional component, by means of which the vehicle function is provided, is stored during the production process of the control device in a data memory of the same and is matched to the available, connected sensor set. A function upgrading or function modification during the operating time of the control device, i.e. after installation in a motor vehicle, is not expected or requires a conversion or service.

Thus, vehicle functions are tied to a respective control device and must be matched to the design of the sensors. Changing a vehicle function is only made possible by a complete substitution of the software of the control device. A download of individual vehicle functions is not expected for a control device. A motor vehicle with a plurality of vehicle functions correspondingly also has a plurality of control devices, so that multiple control devices are present in the motor vehicle, each of which is specially designed.

A diagnostic system for a motor vehicle is known from DE 10 2004 049 155 B3, in which a plurality of software components, which must exchange data with one another, are installed on a common control device. Communication channels are thus shortened.

A method for the electronic detection of traffic signs is known from DE 10 2012 107 886 A1, in which an object detection unit is directly connected with a camera, in order to be able to receive image data from the camera.

Remote operation of an autonomous vehicle is known from DE 10 2015 118 489 A1. A laptop or a computing device in general can be connected in the vehicle to sensors of the motor vehicle and to vehicle systems of the motor vehicles, for example to a propulsion system. The computing device can also be connected with the Internet through a communications interface.

A motor vehicle is described in US 2016/0311285 A1, in which a plurality of sensors are connected to a sensor board, which can report all sensor data in common from all sensors together through a single communication line to a controller. The controller can then control an actuator based on the sensor data. In order for the controller to correctly control the actuator, it must know where actuator-specific characteristics are stored on the sensor board, which are transmitted from the sensor board to the controller during starting of the system, so that the controller can check whether it is still using the correct characteristics. The controller controls the actuator directly through a corresponding interface.

A fundamental object of the disclosure is to be able to flexibly provide vehicle functions in a motor vehicle.

The object is achieved by means of the objects of the independent claims. Advantageous developments of the disclosure are described by the dependent claims, the following description and the figure.

BRIEF DESCRIPTION OF THE DRAWINGS

FIG. 1 shows a schematic representation of a motor vehicle with an off-board level, according to some embodiments of the disclosure.

DETAILED DESCRIPTION

Vehicle functions can be provided in a motor vehicle by means of the method according to the disclosure. Respective examples for such vehicle functions are parking assistance, autonomous driving, climate management, a driver assistance function, automatic separation control, and overtaking assistance.

The motor vehicle can be thought of as being divided into an actuator level and a computing level. For implementing the computing level, the method of the disclosure provides that a computing device of the motor vehicle performs or provides a plurality of vehicle functions. Each of the vehicle functions performed generates command data for at least one respective actuator of an actuator device of the motor vehicle, which in turn represents or constitutes the actuator level. As an actuator, for example, any one of the following can be provided for: an electric motor, a pneumatic system, mechatronics, a pump, an electric lock, a combustion engine, to name only a few examples. The computing device can have one or more microprocessors and/or microcontrollers for performing the vehicle functions. The computing device can be implemented by means of a single control device or by means of a group of several control devices. The vehicle functions can respectively be implemented for example by means of a program module or program code.

In order to logically separate the two levels (computing level and actuator level) from one another or to make them independent, the following is provided for according to the disclosure. In the motor vehicle, the vehicle functions are coupled to the actuator device through an integration component. This integration component can also be a part of the computing device, i.e. also be a program module or program code, for example. The integration component mediates between the vehicle functions, on the one hand, and at least one actuator of the actuator device on the other hand. It is therefore also a mediation component and integrates the at least one actuator into the computing level. To this end, the vehicle functions each output their respective command data to the integration component by means of a respective actuator-independent call routine. A call routine can, for example, be implemented by means of an API (Application Programming Interface). The integration component converts the command data into respective actuator-specific control data and transmits the control data to the respective actuator by means of an actuator-specific control routine. Thus, actuator control is therefore implemented separately from the vehicle functions. Each vehicle function must respectively perform or call or trigger the call routine only at one call interface, in order to transfer their command data to the integration component. This then transforms the respective command data into control data. The integration component can then, for example, transmit or send out the control data over a data network to the respective actuator to be controlled.

Thus, none of the vehicle functions must concern itself or deal with the generation of actuator-specific control data of the actuator device. Instead, each of the vehicle functions calls a call routine of the integration component and transfers the command data which specify what the respective actuator must do or implement. The vehicle function is therefore hardware independent. Thus, there results, for the vehicle function, an integrated protocol for the call routine. Thus, the substitution of an actuator does not also require that the vehicle function be matched. The actuator-specific control data can, however, contain control commands, which can only be interpreted by the controlled actuator. For example, the call routine can generally provide for the setting of a steering angle by specifying "degrees" (e.g. "5° left"), while the relevant actuator, for example, expects a specification in a manufacturer-specific format (e.g. "12 ticks left") as control data. The conversion then occurs in the integration component. Furthermore, each actuator is available to a plurality of vehicle functions through the integration component, so that each vehicle function is not required to provide itself with its own actuator.

As such, the vehicle function, on the one hand, and an actuator on the other hand, can be substituted without the respective other part needing to be matched. The integration component mediates between the vehicle function on the one hand and the at least one actuator of the actuator device on the other hand. As a result, the vehicle functions can be developed independently from the actuators used in the motor vehicle and be used in motor vehicles having different actuators.

Optional developments also apply to the disclosure, resulting in additional advantages.

The integration component preferably receives the command data at a call interface accessible to all vehicle functions. A vehicle function can hereby be retrofitted, and this can additionally output command data by means of a call routine, without particularly needing to be linked with the actuator device. Thus, a new vehicle function can be retrofitted to the motor vehicle, without having to provide an additional actuator for this purpose. The vehicle function can use the common call interface in order to control an existing actuator.

The conversion of command data into respective control data can, for example, provide that unit conversion and/or scaling is performed. This allows the vehicle function to be implemented or developed independently of the actuator-specific definitions of the control data. In some embodiments, each call routine is independent of a manufacturer and/or model of each actuator. Thus, the vehicle function can therefore be developed independently of hardware and/or supplier specifications of the at least one actuator. The matching of a vehicle function to an actuator present in the motor vehicle is accomplished through the integration component. Thus, hardware-independent development or production of a vehicle function is possible.

The vehicle functions on the one hand, and each actuator on the other hand, are preferably so designed that they can be substituted independently of one another. The replacement or substitution of a vehicle function or of an actuator is compensated or masked on the respective other side by the integration component.

The integration component can, like a vehicle function, be designed as a part of the computing device, for example as an additional program module. In some embodiments, the integration component is provided separately from the actuator device and the control routine includes that the integration component sends the control data through a data network of the motor vehicle to the actuator device. The data network can, for example, be formed on the basis of an Ethernet network and/or a data bus system, for example a CAN (Controller Area Network) bus. Therefore, each vehicle function need not provide its own integration component in order to be able to transmit control data to the actuator in the motor vehicle.

Until now, the transmission of control data out of the computing level into the actuator level was described. Inversely, it can also be possible to provide sensor data for the vehicle function from a sensor level. The actuator level can therefore also be a combined sensor-actuator level, which additionally has a sensor unit. As a sensor unit, one of the following can, for example, be provided: a temperature sensor, a rotation speed sensor, a current sensor for electrical current, a liquid level sensor, a camera, to name only a few examples.

In the motor vehicle, the vehicle functions can be coupled with the sensor device through an integration component. The integration component mediates between the vehicle functions on the one hand and at least one sensor unit of the sensor device on the other hand. The integration component is therefore a mediation component and integrates the sensor set into the computing level. For this purpose, the integration component obtains the sensor data from a sensor unit or from a plurality of sensor units of the sensor device independently of the vehicle functions. In other words, it makes no difference in the first place, from the point of view of the integration component, for which of the vehicle functions the sensor data are obtained. In other words, the integration component obtains the sensor data with no demand from any of the vehicle functions. The integration component obtains the sensor data by means of a respective sensor-specific acquisition routine. In other words, the integration component is matched to the respective sensor unit, in order to be able to receive or read out sensor data. The integration component then converts the sensor data into respective environmental data or general condition data. For this purpose, the sensor data can, for example, be converted or combined. In general, the integration component generates condition data from the respective sensor data, i.e. the condition data can also be identical to their underlying sensor data, or can contain them.

Thus, none of the vehicle functions must concern itself or deal with receiving sensor data from the sensor unit or the sensor units of the sensor device. Instead, each of the vehicle functions respectively calls at least some of the condition data provided by means of a sensor-independent call routine from the integration component. Each vehicle function can therefore also use a call routine which need not be matched to the sensor unit or the sensor units of the sensor device. Hence the vehicle function is hardware-independent. Thus, an integrated protocol results for the vehicle function. The substitution of a sensor unit thus does not require that the vehicle function also be matched. Thus, none of the vehicle functions must concern itself or deal with the interpretation of sensor-specific sensor data. Instead, each of the vehicle functions calls a call routine of the integration component and receives the environmental data, which give the measured quantity in a format which can be different from a sensor-specific (e.g. manufacturer defined) format of the sensor data. In contrast, the sensor-specific acquisition routine can contain control commands and/or protocols, which can only be interpreted or generated by the sensor. The acquisition routine can e.g. receive from a sensor a sensor-specific indication, e.g. "12 ticks left" for a steering angle, and generate from it sensor-independent interpretable environmental data, e.g. "5° left." The conversion then takes place in the integration component. In addition, the condition data are available to a plurality of vehicle functions, so that it is not necessary for each vehicle function to obtain the sensor data that it requires from the same sensor unit. Preferably, a single integration component is provided, from which all vehicle functions can retrieve condition data.

The advantage resulting from this is that a vehicle function on the one hand, a sensor unit on the other hand, can be replaced, without the respective other part needing to be matched. The integration component mediates between vehicle functions on the one hand and the at least one sensor unit of the sensor device on the other hand. In addition, the vehicle functions can be developed independently of the sensor units used in the motor vehicle and be used in motor vehicles which have different sensor units.

The integration component preferably makes the condition data available at a retrieval interface which is accessible to all the vehicle functions performed by the computing device. The condition data provided are then selected and called by each vehicle function respectively by means of the call routine described at this retrieval interface. Because the condition data at the retrieval interface are accessible by all vehicle functions, a vehicle function can therefore be retrofitted, and this can also be selected and called by means of a call routine. Thus, a new vehicle function can be retrofitted in the motor vehicle without requiring an additional sensor unit to be provided for this purpose.

As already described, the integration component converts the sensor data into respective condition data. This can be accomplished by performing a unit conversion. Thus, for example, a conversion can be made for a steering angle between degrees and a manufacturer-defined indication. In addition or alternatively to this, a scaling can be performed. Thus, a value range of the sensor data can be matched to a value range required by a vehicle function. In addition or alternatively to this, a plurality of sensor signals respectively represented by the sensor data can be linked to an environmental signal from which condition data can then be called by a vehicle function. Thus, preprocessing can be provided by the integration component. The conversion of sensor data into condition data makes the sensor units replaceable, without necessitating the interpretation of the condition data by the vehicle functions.

Until now, two logical levels were considered, namely the computer level or computing level on the one hand, and the sensor-actuator level below it. A third level above it can also be provided, namely an off-board level external to the vehicle. In order to implement this, a computing device is preferably coupled to a communication device. The communication device maintains a respective communication link with at least one external device external to the vehicle. An external device of this type can be a device external to the vehicle or a mobile terminal located in the motor vehicle. An external device external to the vehicle can, for example, be an Internet server or another motor vehicle. For transmitting the data, a mobile radio (e.g. GSM, UMTS, LTE) module can for example be provided in the communication device and/or a WLAN (Wireless Local Area Network) module or a communication module for a Car2X communication or vehicle-to-vehicle communication. The integration component can couple the sensor level with the off-board level. For this purpose, it can be provided that the integration component sends at least one of its condition data (formed from the sensor data) to at least one relocated vehicle function performed externally to the vehicle through the communication device. An "off-board" vehicle function can therefore be performed externally to the motor vehicle. For a relocated vehicle function of this type, this can for example be navigation assistance (route guidance) or speech recognition.

Both the vehicle's own and vehicle-internal vehicle functions can be coupled with the off-board level. For this purpose, the integration component can receive source data as sensor data through the communication device. From the source data, the integration component can generate additional condition data for the vehicle functions maintained in the motor vehicle. For example, weather data can be provided in this manner as additional condition data or as media content (music streaming, video streaming) or map data. The vehicle function can then also retrieve this additional condition data by means of at least one retrieval routine, just as sensor data can be retrieved. It can therefore make no difference to a vehicle function whether the condition data originate in the off-board level or from the sensor level. It can likewise be provided that the control of at least one actuator of the actuator level is accomplished from the off-board level. For this purpose, therefore, command data can be transmitted from a relocated vehicle function through the communication device into the motor vehicle to the integration component, which then forms control data for at least one actuator of the actuator device of the motor vehicle. Finally, it can also be provided that a vehicle function performed in the motor vehicle generates command data, on the basis of which the integration component sends off-board by means of the communication device to an actuator device external to the vehicle as actuator-specific control data.

It is preferably provided, due to flexibility in retrofitting of vehicle functions, that the computing device retrofits or installs at least one additional vehicle function based on application data (meaning program data or a program module for an additional vehicle function), and then couples it with the installation component. Thus, a vehicle function can therefore be retrofitted in the computing device. For this purpose, the application data can, for example, be received through the communication device.

Until now, the sensor device has been described as passive; the actuator level containing only the sensor units or sensor-actuator level, in which all logic or processing is shifted to the computing level. In some embodiments, at least one actuator of the actuator device operates a respective protection function and the respective self-protection function autonomously, independently of the integration component, generates control data based on its own operating data. Thus, the actuator can react to a critical condition, for example overheating and/or overloading, without feedback from the integration component, e.g. without the processing time required for this purpose. In some embodiments, at least one sensor unit of the sensor device operates a respective self-protection function and the respective self-protection function autonomously, independently of the integration component, generates control data based on the sensor data of the sensor unit. Thus, within the sensor unit, an actuator, for example, can therefore be controlled or a sensor unit switched off. The sensor device is thus not completely passive. For example, self-stopping of a sensor can occur if this is operated outside of a permissible operating range, is overheated for example.

The described indirect transmission of command data through the integration component to the at least one actuator can lead to a lag or to a reduction of the data rate. In order not to accept this for an actuator, which requires a prescribed minimum data rate for control data, it can be provided that at least one vehicle function is coupled with at least one actuator of the actuator device by a direct link bypassing the integration component device and sends control data to the actuator with a data rate which is greater than one provided by the integration component for the command data of the vehicle function.

The described computing level is necessary in order to execute the method according to the disclosure in a motor vehicle. In order to provide this, a computing device is also provided by the disclosure for a motor vehicle, whereby the computing device has at least one processor (microprocessor or microcontroller) for implementing vehicle functions. The computing device also has, according to the disclosure, the described integration component, which is so configured as to couple the vehicle functions with an actuator device of the motor vehicle and to receive from the vehicle functions respective command data by means of a respective actuator-independent call routine and to convert the command data into respective actuator-specific control data and to transmit the control data by means of an actuator-specific control routine to a respective actuator of an actuator device of the motor vehicle.

The motor vehicle also pertaining to the disclosure has the actuator device with the at least one actuator as well as an embodiment of the computing device according to the disclosure, whereby the actuator device is coupled to an integration component of the computing device.

In some embodiments, the motor vehicle also has a sensor device with at least one sensor unit and this sensor device is also coupled with the integration component of the computing device.

Also pertaining to the disclosure are further developments of the computing device according to the disclosure and of the motor vehicle according to the disclosure, which exhibit features that were already described in connection with the further developments of the method according to the disclosure. For this reason, the corresponding further developments of the computing device according to the disclosure and of the motor vehicle according to the disclosure will not be described again here.

Embodiments of the disclosure are described hereafter. To this end, FIG. 1 shows a schematic representation of an embodiment of the motor vehicle according to the disclosure together with an off-board level.

In the embodiments explained hereafter, preferred embodiments of the disclosure are involved. In the exemplary embodiments, the described components of the embodiments represent the respective individual features of the disclosure, to be considered independently of one another, which the disclosure respectively further develops, again independently of one another and are thereby also to be considered individually or in another combination than that shown as components of the disclosure. Moreover, the described embodiment can also be complemented by additional already-described features of the disclosure.

FIG. 1 shows schematically a motor vehicle 10, which can be a motorcar, particularly a private motorcar or truck. In addition, an off-board level 11 (OFFBOARD) external to the vehicle is shown, which can include, for example, a mobile end device 12 and/or an Internet server 13 and/or external vehicles 14. These respectively represent an external device external to the vehicle. The vehicle's own area or that pertaining to the vehicle 10 is designated as the on-board area ONBOARD.

In the motor vehicle 10, its electronic architecture 15 can be divided into two levels, namely a computing level 16 and a sensor/actuator level 17. The computing level 16 can be formed by a computing device 18, which can include one or more processors 19. On the sensor/actuator level 17, a sensor device 20 and an actuator device 21 can be provided. The sensor device 20 can include sensor units 22, for example a steering angle sensor and/or a sensor set of a high-voltage battery and/or a radar. The actuator device 21 can have one or more actuators 23, for example an electrically operable or movable door and/or a trunk lid motor and/or a window lifter. Generally, the sensor-actuator level 17 provides specific, sensor/actuator linked functions, such as for example electronic stability control (ESC), window lifter control, motor control for a drive motor of the motor vehicle 10.

The sensor/actuator level 17 can be linked with the computing level 16 through a data network 24. Sensor data 25 can thus be transmitted from the sensor device 20 to the computing device 18. Control data 26 can be transmitted from the computing device 18 to the actuator device 21.

The computing device 18 can be provided for maintaining at least one functional component 27. A functional component 27 can, for example, be a program module or a software component. Due to the maintenance of the functional component 27, at least one vehicle operation 28 is respectively performed by the respective functional component 27. Examples of vehicle functions of this type are automated driving, the provision of an environmental model for modeling an environment of the motor vehicle 10 and/or an interior setting of the motor vehicle 10 and thermometer management. Generally, the vehicle functions 28 represent comprehensive, computation- and/or data-intensive vehicle functions which do not require direct implementation on the sensor device 20 and/or the actuator device 21.

The functional components 27 need not in this case be able to directly process the sensor data 25. Likewise, the functional components 27 need not be designed to generate the control data 26. Rather, the sensor/actuator level 17 and the computing level 16 are coupled through an integration component 29, which can convert the sensor data 25 into condition data 30. The control data 26 which can be generated by vehicle functions 28, can be generated from command data 31 by the integration component 29.

Hence, the vehicle functions 28 need only communicate with the integration component 29. For this purpose, they can retrieve the condition data 30 by means of a respective retrieval routine 32 from a retrieval interface of the integration component 29. The command data 31 can deliver the vehicle functions 28 at a call interface 34 by means of a respective retrieval routine 35 in the integration component 29.

The integration component 29 can receive the sensor data 25 from the data network 24 by means of an acquisition routine 36. For example, the acquisition routine 36 can provide for the readout of a CAN bus. The integration component 29 can deliver the control data 26 to the actuator 23 through the data network 24 by means of a control routine 37.

With respect to the off-board level 11, it is provided that its components 12, 13, 14 can be provided as data suppliers for source data 40. These can be received by means of a communication device 41 of the motor vehicle 10 by means of respective communication links 42, for example from the end device 12 and/or the server 13 and or an external vehicle 14. Moreover, a relocated functional component 27' can also be operated on the server 13 for example, by means of which relocated vehicle functions 28' can be implemented. These can then also be used in the motor vehicle, for example for route planning, navigation and/or map information or map data can be provided as source data 40. Moreover, condition data 30 in the off-board level 11 can also be provided through the communication links 42.

The processors 19, the communication device 41 and the data network 24 can be lined through a data highway, i.e. a data bus system and/or data network system, such as for example a PCI bus (PCI—Peripheral Component Interconnect).

Due to the separation of the vehicle functions 28 from the sensor/actuator level 17 and the use of sensor-independent retrieval routines 32 as well as actuator-independent retrieval routines 35, a vehicle function 28 can be developed independently of the design of the sensor units 22 and actuators 23. The pertinent functional components 27, i.e. the program code, can be flexibly downloaded into the computing device 18, the abstraction of the sensor/actuator level 17 from the computing level 16 is made possible by the integration component 29, which makes possible a hardware-independent development of the functional components 27.

The three levels 11, 16, 17 are consistently integrally linked or arranged by means of consistent communication and protocol mechanisms, based on the retrieval and call routines.

Thus, there results a functional overall concept for the implementation of hardware-independent vehicle functions 28, 28'.

Integral guidelines for the division of individual vehicle functions 28, 28' into sub-functions can be undertaken, wherein the assignment of each sub-function into one of the levels 11, 16, 17 can be accomplished. This results in significantly better understanding of the system and better straightforwardness. This makes possible easy downloading of functional components 27, hence of functionalities, into the motor vehicle 10. If an error occurs, this can be searched for systematically.

Preferably, the following distribution of the described sub-functions into the architecture occurs.

The sensor/actuator level 17 is provided for hardware-dependent control and data processing. These can be mechatronic-dependent functions such as the control of hardware, the reading/provision of sensor values and/or self-protection, such as temperature monitoring and/or the interruption of an electrical current. Actuator-depending control can also be provided, such as the ESC control. The sensor/actuator level 17, however, contains no functions that extend beyond it, such as for example speed control for the propulsion motor. Thus, there results namely one smart-sensor and smart-actuator concept provided by self-protection. However, while the sensor units 22 and the actuators 23 do not interact directly with the vehicle functions 28, standardized components can be used, which then can be made available through the integration component 29 for the vehicle functions 28.

Due to the integration component 29, domain management results in which the sensor device 20 and the actuator device 21 are made available for the functional components 27 by means of the integration component 29. Thus, there results therefore an input/output pre-processing 20 for the actual vehicle functions. Domain-specific functions can also be provided, such as charge management, keyless entry and engine starting and/or steering control. In general, a mechatronically independent functionality is practicable in the computing level 16.

The functional components 27 can be implemented with high-performance computing power by means of the processors 19 of the computing device 18. Thus, efficient hardware and operating system software is available in order to carry out vehicle functions 28. Cross-vehicle computing and data-intensive vehicle functions, such as autonomous driving, the provision of an environmental model and/or machine learning can also be practicable. No matching to hardware-specific input/output is required.

Generic computing power is therefore provided by the computing device 18, by means of which desired vehicle functions, which are mechatronically independent, can be performed.

Computing and data-intensive vehicle functions, such as swarm data analysis for the evaluation of environmental data of a plurality of motor vehicles, can be performed by the off-board level 11. Relocated vehicle functions 28' provided for a specific vehicle can also be performed, such as navigation or speech recognition. Data sources for the vehicle functions 28, such as for example music streaming and/or object recognition of surrounding objects and/or receiving warning from other motor vehicles and/or map data in the motor vehicle 10 through the communication links 42, can also be linked.

Overall, the examples show how an automotive 3-level concept can be provided for a motor vehicle by means of the disclosure.

The invention claimed is:

1. A method comprising:
   performing a vehicle function in a computing device of a motor vehicle;
   generating, by the vehicle function, command data for an actuator of the motor vehicle;
   coupling the vehicle function and the actuator through an integration component;
   calling, by the vehicle function, an actuator-independent call routine, wherein the vehicle function gives a consistent protocol to the actuator-independent call routine so that the vehicle function is hardware-independent and that substitution of the actuator does not require the vehicle function to be modified;
   outputting, by the vehicle function, the command data to the integration component by means of the actuator-independent call routine;
   converting, by the integration component, the command data into actuator-specific control data of the actuator, wherein generation of the actuator-specific control data is independent of the vehicle function; and
   transmitting, by the integration component, the actuator-specific control data to the actuator by means of an actuator-specific control routine.

2. The method according to claim 1, further comprising:
   receiving, by the integration component, the command data at a call interface accessible for the vehicle function.

3. The method according to claim 1, further comprising:
   converting, by the integration component, the command data into the actuator-specific control data, by performing at least one of unit conversion or scaling.

4. The method according to claim 1, wherein the actuator-independent call routine is independent of a manufacturer or a model of the actuator.

5. The method according to claim 1, further comprising:
   changing the vehicle function and the actuator independently from one another.

6. The method according to claim 1, further comprising:
providing the integration component separately from the actuator, wherein the integration component comprises the actuator-specific control routine; and
transmitting, by integration the component, the actuator-specific control data over a data network of the motor vehicle to the actuator.

7. The method according to claim 1, further comprising:
generating, by the vehicle function, the command data based on sensor data of a sensor device of the motor vehicle;
coupling the vehicle function with the sensor device through the integration component;
obtaining, by the integration component, the sensor data from a sensor unit of the sensor device, independently from the vehicle function by means of a sensor-specific acquisition routine;
converting, by the integration component, the sensor data into condition data; and
retrieving, by the vehicle function, the condition data by means of a sensor-independent retrieval routine.

8. The method according to claim 7, further comprising:
converting, by the integration component, the sensor data into the condition data by performing unit conversion, scaling, or linking the sensor data to environmental data.

9. The method according to claim 7, further comprising:
coupling the integration component to a communication device;
maintaining a communication connection with an external device external to the motor vehicle;
transmitting, by the integration component, the condition data to an additional vehicle function maintained externally to the vehicle through the communication device;
receiving, by the integration component, source data through the communication device; and
converting, by the integration component, the source data into additional condition data for the vehicle function maintained in the motor vehicle.

10. The method according to claim 1, further comprising:
retrofitting, by the computing device, an additional vehicle function; and
coupling the additional vehicle function to the integration component based on application data.

11. The method according to claim 1, further comprising:
maintaining, by the actuator, a self-protection function; and
generating, autonomously by the self-protection function, the actuator-specific control data based on operating data of the self-protection function, independently from the integration component.

12. The method according to claim 1, further comprising:
coupling the vehicle function with the actuator through a direction connection bypassing the integration component; and
transmitting the actuator-specific control data to the actuator at a data rate, wherein the data rate is greater than data rates provided by the integration component for the command data of the vehicle function.

13. A motor vehicle, comprising:
an actuator configured to be controllable by means of actuator-specific control data; and
a computing device, comprising:
 a processor configured to perform a vehicle function; and
 an integration component configured to:
  receive command data from the vehicle function by means of an actuator-independent call routine, wherein the command data specify a required function of the actuator;
  convert the command data into the actuator-specific control data, wherein the actuator-specific control data are generated independently from the vehicle function; and
  transmit the actuator-specific control data by means of an actuator-specific control routine to the actuator,
  wherein the integration component is further configured to provide a consistent protocol for the actuator-independent call routine, so that the vehicle function is hardware-independent and substitution of the actuator does not require the vehicle function to be modified.

14. The motor vehicle according to claim 13, further comprising:
a sensor device configured to generate sensor data, wherein the sensor device is coupled to the integration component of the computing device.

15. The motor vehicle according to claim 13, wherein the actuator-independent call routine is independent of a manufacturer or a model of the actuator.

* * * * *